May 31, 1966  A. N. SPANEL  3,253,597
LINED ARTICLES

Filed Sept. 6, 1963  2 Sheets-Sheet 1

A. N. SPANEL  INVENTOR.

BY Anthony P. Mentis

ATTORNEY

May 31, 1966  A. N. SPANEL  3,253,597
LINED ARTICLES

Filed Sept. 6, 1963  2 Sheets-Sheet 2

A.N. SPANEL INVENTOR.

BY Anthony P. Mentes

ATTORNEY

United States Patent Office 3,253,597
Patented May 31, 1966

3,253,597
LINED ARTICLES
Abraham N. Spanel, Princeton, N.J., assignor to International Latex Corporation, Dover, Del., a corporation of Delaware
Filed Sept. 6, 1963, Ser. No. 307,122
21 Claims. (Cl. 128—521)

This invention represents cool comfortable articles such as girdles made of rubbery materials with liners of unique characteristics. More particularly the invention embraces rubbery goods provided with breathable liners. In addition the invention embraces dipped, sprayed, latex or molded, sectionally cemented or stitched rubber fabric goods provided with liners of the aforesaid type with or without a layer of flock secured thereto.

Many articles of deposited latex rubber, for example, girdles, brassieres, gloves, shoe liners, sheetings and the like are exposed to conditions which tend to shorten their service life. Attack by body perspiration, body oils and other skin secretions, ozone, and abrasion all tend to degrade such rubber articles. Such articles provided with foam rubber liners of the prior art have also been subject to the above degrading influences because of the susceptibility of the rubber of which the foam was made.

One object of the present invention is to provide articles such as girdles made with a rubbery material such as deposited latex where the surface adapted to contact the body is durable and resistant to body secretions.

It is a further object of the invention to provide deposited latex articles such as girdles having an inner liner which, while being resistant to body-oils, is also cool and comfortable to the wearer.

It is a still further object to provide dipped, sprayed, latex or molded, sectionally cemented or stitched rubber fabric goods with linings of body-oil resistant materials and a layer of flock secured thereto.

According to the present invention articles adapted to have an inner surface contact the human body such as girdles, brassieres, gloves, shoe linings, sheetings and the like are essentially characterized by the fact that they are provided with a lining or liner having relatively large holes over a substantial part of its surface, or with a combination of these and relatively small holes. The fact that the liner is not a continuous insulating sheath and is provided with a multiplicity of relatively large openings facilitates the transport of body moisture and body heat.

The liner may be foamed fabric sheeting such as foamed elastomeric polyurethane, foamed Buna N, foamed polychloroprene and similar materials which are resistant to abrasion, ozone, body-oils and other body secretions. Foamed is here used in its generally accepted meaning to designate material that contains bubbles of air or other gas. Elastomeric polyurethanes are especially advantageous in being capable of being made in relatively thin sheets of the order of 1/16" to 3/32" in thickness while still retaining excellent resistance to abrasion, etc. Such liners slip on and off the body of the wearer easily especially if provided with a flocked surface of cotton, linen, rayon, silk or any of the smooth man-made fibers, or in any desired combination of these.

The liner may also be woven, knitted or unwoven cloth made from any natural or synthetic filament such as wool, silk, cotton, linen, rayon, nylon, Dacron, Banlon and the like and mixtures thereof. It is obvious that as with foamed latex or plastic fabric sheeting, holes of a predetermined size and pattern, or of random dimensions and pattern, may be punched out of a fabric that is woven, knitted or unwoven in character. However, unlike foamed fabric sheeting, in a woven or knitted fabric punched holes have a tendency to appear frayed on the exposed surface of the fabric after wearing and washing. It is therefore preferred to make such a fabric liner with such holes woven or knitted as part of the fabric, thus minimizing or entirely eliminating the fraying around the perimeter of the said holes after the liner has been cemented to the body or carcass of the girdle or like article.

Polyurethanes are presently preferred for making the liners and are described as materials made from various base polymers reacted with diisocyanates to form polyurethane polymers, that is, polymers containing more than one urethane linkage

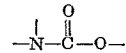

in the structure. The base polymers may vary widely as to chemical composition and molecular structure and may have a wide range of physical properties dependent upon the chemical composition. One method of preparing polyurethane compounds is to react an essentially linear polyester having terminal hydroxy groups with a diisocyanate. Polyethers are another class of materials which may be used to react with diisocyanates to form polyurethanes. When water is present, the reaction will produce carbon dioxide gas as a by-product which causes the mass of reaction product to become foamed.

The polyurethane polymers may be suitably produced from linear polyesters prepared by reacting polyhydric alcohols, for example ethylene and propylene glycols or mixtures thereof with polycarboxylic acids, for example, aliphatic dicarboxylic acids such as adipic, pimelic, sebacic, methyl adipic and succinic acids using an excess of the alcohol over the acid so that the resulting linear polyester contains terminal hydroxy groups. The polyester is then reacted with a diisocyanate, for example, an aromatic diisocyanate such as 1,4-toluene diisocyanate; naphthalene 1,5-diisocyanate and the like; also aliphatic diisocyanates such as hexamethylene diisocyanate. By proper proportioning of the hydroxyl containing polymer and the diisocyanate, as is well known in the art, and carrying out the reaction in the presence of water, elastomeric foamed polyurethanes are produced. Polyalkylene ether glycols, usually referred to as polyethers, include polyethylene glycols, polypropylene glycols, polybutylene glycols and the like and are similarly suited for making elastomeric polyurethanes.

There are many kinds of polyesters, polyethers and diisocyanates which may be used form polyurethanes and a fuller discussion may be found in the literature including U.S. Patents, 2,284,896; 2,292,443; 2,333,639; 2,374,- 163; 2,764,565; German Plastics Practice by De Bell et al. 1946; and Polyurethanes, by B. A. Dombrow, Reinhold Publishing Co., 1957, etc.

In certain applications it is advantageous to provide the inner surface of the article with a layer of very short, individual fibers of natural or man-made filaments such as cotton, linen, rayon, nylon, etc., otherwise known as flock.

The numerous modifications to which the invention is directed can better be described and understood by reference to the following drawings in which.

Figures 1, 2:
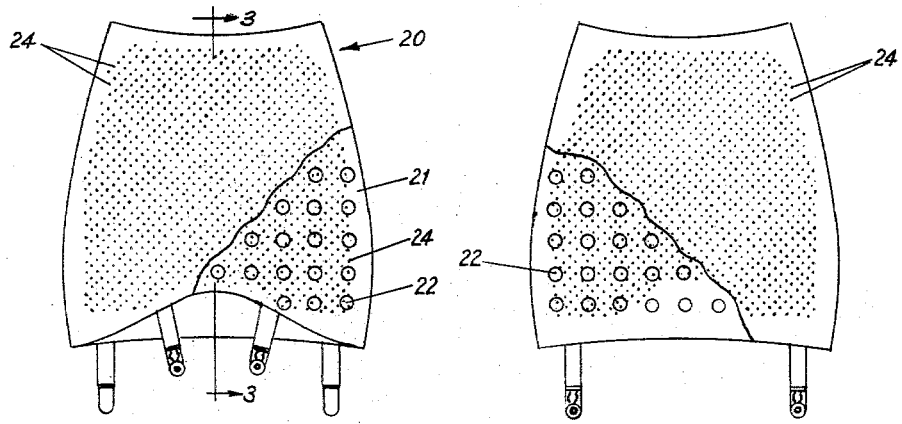
FIGURE 1 is a front view of a girdle with a cut-away portion showing the perforated liner.
FIGURE 2 is a rear view of the girdle of FIGURE 1.
Figures 3, 5:
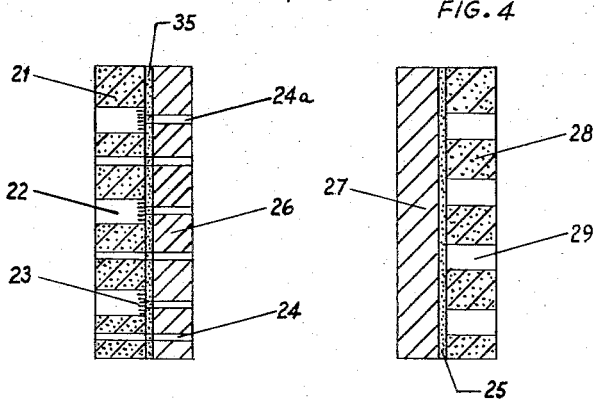
FIGURE 3 is a view along lines 3—3 of FIGURE 1 showing the relationship of the openings in the liner with those in the backing sheet or carcass of the girdle.
FIGURE 5 is a view along lines 5—5 showing the relationship of the backing sheet and the liner.

One embodiment of the present invention is represented in FIGURES 1 through 3 which show a latex girdle 20 with an inner liner 21 of perforated, foamed polyurethane. In making the girdle, a girdle form is sprayed with liquid latex or is dipped repeatedly into a bath of liquid latex to build up layers of latex according to principles well known in the art. The built-up layers of latex at this stage may be referred to as the "latex substrate."

A thin polyurethane foam sheet about 1/16" to 3/32" thick having interconnected cells is perforated, for example, with a 3/8" punch with 3/8" spacings between the holes 22. It is to be understood that the holes may be larger or smaller and may be distributed in either a predetermined or random manner. The edges of the foam sheet are preferably butt-edge cemented together to form a sheath or tube, which is preferably tapered but may be cylindrical. It is obvious that other methods may be used to form the sheath in addition to butt-edge cementing as for example sewing, etc. The sheath preferably approximates quite closely the shape of the latex substrate.

The latex substrate is dipped into a bath of adhesive which may be a polyurethane adhesive or any suitable adhesive. Upon withdrawing from the adhesive bath, there remains a thin layer of adhesive on the latex substrate. The liner sheath may then be put under some tension to expand it some and the latex substrate inserted into it. The tension is removed from the liner sheath to allow it to contract and embrace the latex substrate which is covered with the still relatively wet adhesive layer. Gentle pressure is applied to the foam liner to make it adhere uniformly to the latex substrate.

Figure 6:
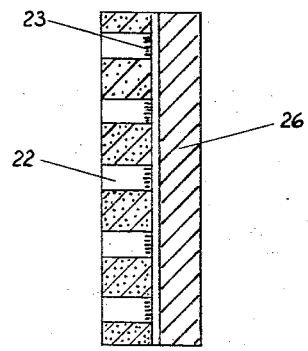
FIGURE 6 is a cross sectional view of a lined girdle which has been flocked before the rubber backing sheet has been punched.
Figure 7:
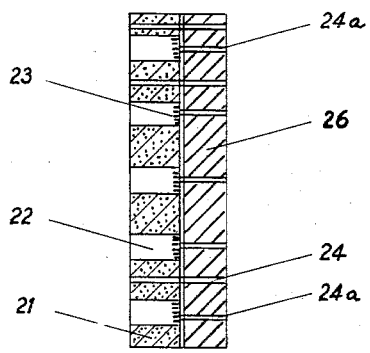
FIGURE 7 is a cross sectional view of the flocked article of FIGURE 6 after the backing sheet has been punched.

The assembly may then be flocked while the adhesive layer is still relatively wet. Flocking is done by blowing onto the surface relatively short individual fibers 23 such as cotton which adhere only to the exposed wet surface areas of the carcass 26 showing through the holes 22 in the liner, as shown in FIGS. 3 and 6. The assembly is then dried and cured according to methods known in the art. After curing, the girdle and its adhered liner are stripped from the girdle form and treated to slightly harden the exposed latex surface. The girdle is then trimmed top and bottom and holes 24 which are relatively small and preferably about .04 to .06 inch in diameter are punched through the carcass wall and the liner, that is, the entire wall of the completed girdle. Some of these holes designated as 24a in FIGS. 3 and 7, in substantial number, communicate with the larger holes in the liner. It is clear that there are many ways of making separate predetermined openings in a relatively thin sheet of foamed material, just as there are many ways of making predetermined openings in the carcass of the girdle. In one form it is preferred to perforate the foamed liner by clicking, and the carcass in the same manner but it is to be understood that all possible methods are contemplated as being useful.

The adhesive 35 which may be used to adhere the liner 21 to the backing sheet or carcass 26 of the girdle may be selected according to the nature of the carcass and the liner. The adhesive may be a polyurethane adhesive, as previously stated, or may be any latex cement or rubber cement. The liner may, however, be secured to the carcass by other means.

Preferably the liner may be characterized as having continuous areas and discontinuous areas or openings such as holes and flocking may be done on the surface in the exposed hole areas only, on the continuous areas only of the liner, or on both the continuous areas of the liner and the exposed surfaces of the hole areas, but it should be clear that the liner may be discontinuous and that the openings may be continuous as would be the case for example if circles of foam fabric of, say, 1½" in diameter were cemented on a substantial portion of the inside surface of the carcass 1/8" apart from each other. The liner thus may be described as having relatively large openings extending over a substantial portion of the surface area of the liner which are larger than the pores or interstices normally present in the liner material. These openings comprise continuous areas and discontinuous areas which expose part and cover part of the underlying surface of the backing layer but do not extend into the backing layer. In the one case the continuous areas cover part of the underlying surface of the backing layer or carcass and the discontinuous areas expose part of the underlying surface. In the other case the continuous areas expose part of the underlying surface and the discontinuous areas cover part of the underlying surface. Stated differently, either the continuous areas or the discontinuous areas may comprise the relatively large openings and either or both may be flocked. In general flocking reduces the rough feel of the latex surface, increases the absorption and removal of perspiration and facilitates donning of the garment.

The relatively large holes 22 in the liner appear to entrap air and act as collecting stations for the transport of heat and perspiration to the outside atmosphere through the communicating holes 24a. The success of the instant invention is not to be predicated upon any theory of operation.

With a foamed liner it is practical to make the size of the porous openings or perforations in the carcass larger than .06 inch without leaving perforation marks on the body of the wearer. Also the perforations in the carcass can be made relatively larger even if the carcass and its adhered foamed liner are perforated at the same time, no marks being left on the skin of the wearer since the spongy character of the liner serves to cushion out such markings. The perforations may be produced in any desired manner and in any desired order; the liner may be perforated and then cemented to the carcass; the liner may be perforated and cemented to the carcass and then simultaneously perforated; the liner and the carcass may be separately perforated and then cemented together; or the liner and carcass may be cemented together and simultaneously perforated, or any other combination of perforating and cementing may be used.

Figure 4:
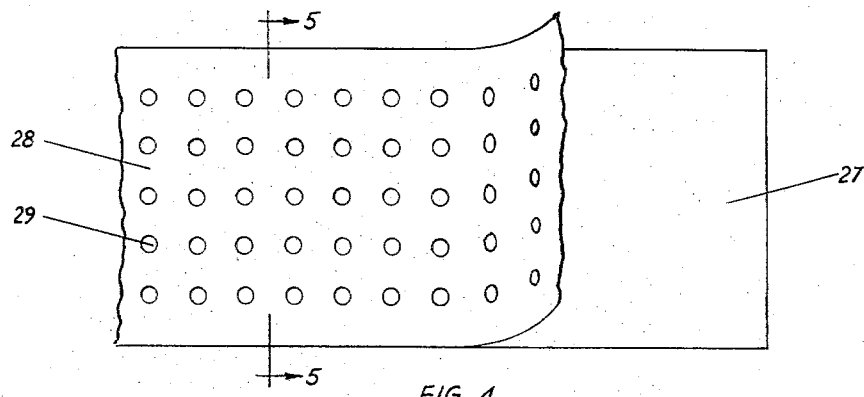
FIGURE 4 is a view of a backing sheet of rubber with a superposed liner of perforated foam united together with an adhesive. Unlike in FIGS. 1 and 2, the perforations shown here are of relatively large size, the smaller or random sized ones not being shown.

Instead of cementing a preformed foam liner to the carcass, other methods may be employed to provide a layer of foamed liner material adhered to the carcass. For example a backing sheet 27 in FIGURE 4 may be adhesively united to liner 28 having relatively large holes 29 by means of a suitable adhesive 25 and the laminate cut and sewn to form the girdle. Also a latex substrate may be dipped into a bath of polyurethane latex containing a blowing agent, then removing from the bath and heating to activate the blowing agent. The blowing agent gassifies the polyurethane to form an adherent foamed layer.

Figure 9:
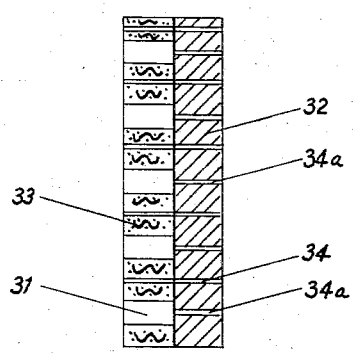
FIGURE 9 is a cross section view of a perforated cloth liner united to a perforated rubber backing sheet.
Figure 8:
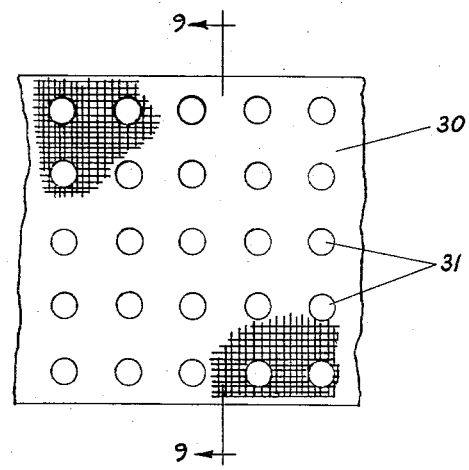
FIGURE 8 is a view of a woven or knitted fabric with holes formed during its manufacture.

As previously stated the liner may be of cloth. FIGURE 8 shows a woven or knitted fabric 30 with holes 31 formed during the manufacture of the fabric. FIGURE 9 is a cross-section view of a girdle having a perforated backing sheet or layer 32 united to a fabric liner 33 having relatively large holes 31 which are larger than the pores or interstices normally present in the fabric. Smaller holes 34 penetrate both the backing sheet and the fabric liner and some of the holes 34a communicate with some of the openings 31.

The invention has been illustrated by girdle structures where the carcass is made of dipped, sprayed, latex or molded, sectionally cemented or stitched rubber fabric goods but it should be understood that the practice of the invention may be applied to undergarments and other structures where the carcass is porous, such as rubber, latex, graft-rubber polymers, cloth, including for example knitted fabrics, stretchable fabrics with or without elastic threads, and the like. As previously stated, the invention is widely applicable and may be used in girdles, brassieres, gloves, sheeting, shoe liners and the like.

Many changes and modifications of the invention may be made without departing from the spirit thereof and it is to be understood that all such changes and modifications are intended to be covered in the appended claims.

I claim:

1. An article of wear adapted to have its inner surface contact the human body comprising an elastomeric backing layer with a liner secured to one of its faces and coextensive therewith, the liner having relatively large spaced openings over a part of its surface which openings are larger than the pores or interstices normally present in the liner and which extend through the liner but not into the backing layer, the article of wear having smaller openings which extend through both the backing layer and the liner.

2. The article of claim 1 wherein the liner is a foam.

3. The article of claim 1 wherein the liner is fabric.

4. An article for wear on the body comprising a porous backing layer with spaced relatively small perforations and a liner secured to one of its faces and coextensive therewith, the liner having relatively larger openings which are larger than the pores or interstices normally present in the liner and which extend through the liner but not into the backing layer, said liner comprising continuous areas and discontinuous areas which expose part and cover part of the underlying surface of the said backing layer, the said relatively small perforations extending through both the backing layer and the liner, some of the relatively smaller perforations communicating with some of the said relatively larger openings.

5. The article of claim 4 wherein the said discontinuous areas comprise the relatively larger openings and expose part of the said underlying surface.

6. The article of claim 4 wherein the said continuous areas comprise the relatively larger openings and expose part of the said underlying surface.

7. The article of claim 4 wherein the liner is a foam.

8. The article of claim 7 wherein the liner is foamed polyurethane.

9. The article of claim 4 wherein the liner is cloth.

10. The article of claim 4 wherein the backing layer is elastomeric.

11. The article of claim 4 wherein the article is a girdle.

12. The article of claim 4 wherein only the surface of the backing layer exposed by the relatively larger openings in the liner is covered with relatively short individual fibers.

13. The article of claim 4 wherein only the areas of the liner which cover the underlying backing layer are covered with relatively short fibers.

14. The article of claim 4 wherein both the liner and the areas of the backing layer exposed by the openings of the liner are covered with relatively short fibers.

15. An undergarment having an outer wall of porous elastomeric material with a foam liner secured to one of its faces and coextensive therewith, the liner having predetermined holes of relatively large size extending over a part of the surface area of the liner, said holes being larger than the pores or interstices normally present in the liner and which expose the underlying surface of the said outer wall without extending into said wall.

16. The undergarment of claim 15 wherein the elastomeric material of the outer wall is latex.

17. The undergarment of claim 15 wherein the liner is a foamed rubbery material substantially resistant to abrasion and body skin secretions.

18. The undergarment of claim 15 wherein the liner is a foamed elastomeric polyurethane.

19. A deposited latex girdle with a liner of foamed elastomeric polyurethane secured to one of its faces and coextensive therewith, the liner having spaced holes over a portion of its surface which are larger than the pores or interstices normally present in the liner and which expose underlying areas of the latex, the latex having holes smaller than the said spaced holes of the liner, and which extend through both the latex and the liner.

20. The deposited latex girdle of claim 19 wherein the said exposed areas of latex are covered with relatively short individual fibers.

21. An article for wear on the body comprising an elastomeric backing layer with spaced perforations and a perforated foam-liner secured to one of its faces and coextensive therewith, the perforations in the foam-liner being larger than the pores or interstices normally present in the foam-liner, the said perforations in the backing layer, in substantial number, communicating with the perforations in the foam-liner.

References Cited by the Examiner

UNITED STATES PATENTS

| | | | |
|---|---|---|---|
| 2,077,514 | 4/1937 | Callahan | 161—76 X |
| 2,622,052 | 12/1952 | Chandler | 156—25.2 |
| 2,628,928 | 2/1953 | Cadous | 161—77 |
| 2,648,619 | 8/1953 | Alderfer | 161—159 X |
| 3,016,318 | 1/1962 | Sudman | 161—159 X |
| 3,017,889 | 1/1962 | Miller | 128—521 |
| 3,072,520 | 1/1963 | Groth | 156—252 |
| 3,075,532 | 1/1963 | Dodge | 128—521 |
| 3,077,882 | 2/1963 | Trewella | 128—156 |

FOREIGN PATENTS 821,537  10/1959  Great Britain.

ADELE M. EAGER, *Primary Examiner.*